Dec. 5, 1961 D. E. DAHLGREN 3,011,564
PULVERIZING AND MIXING MACHINE
Filed Aug. 21, 1957 4 Sheets-Sheet 1
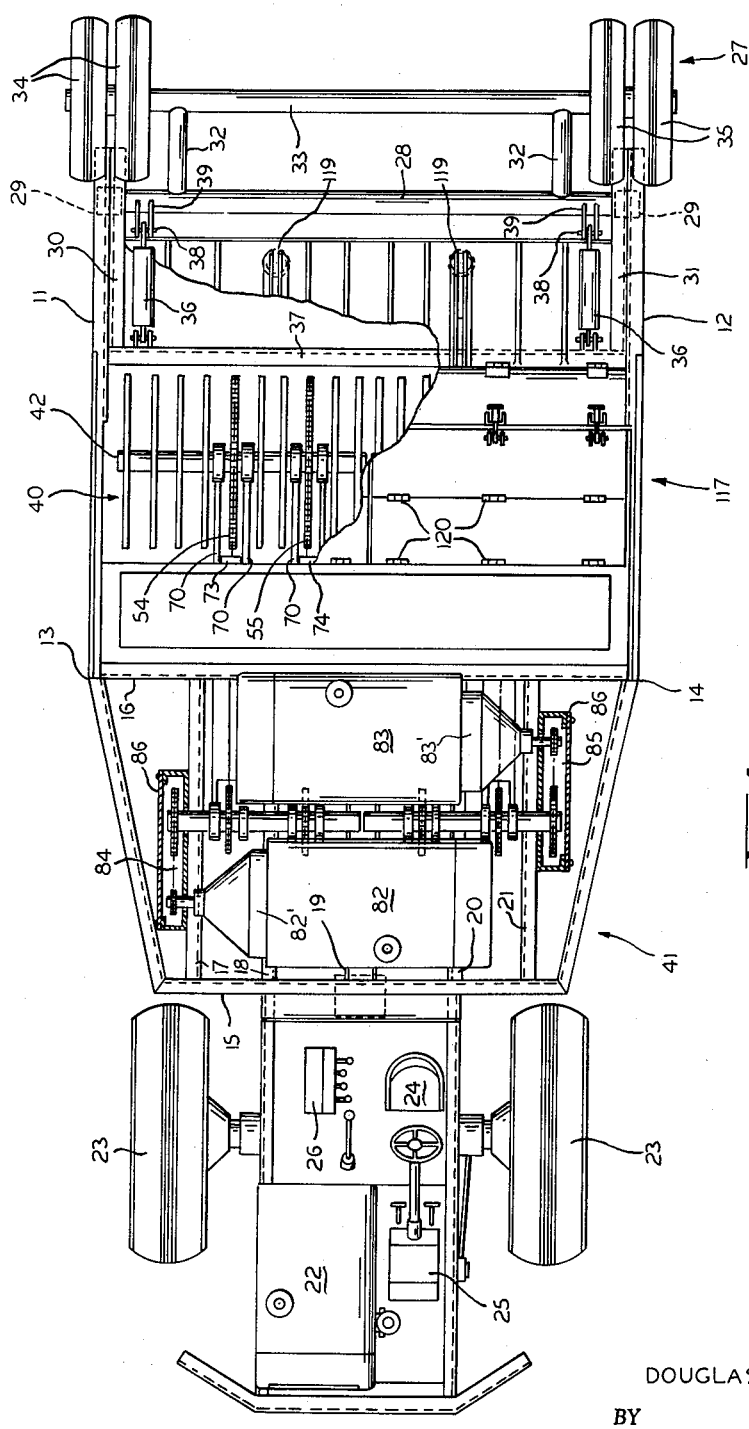
INVENTOR.
DOUGLAS E. DAHLGREN
BY
SCHNEIDER, DRESSLER & GOLDSMITH
ATTORNEYS

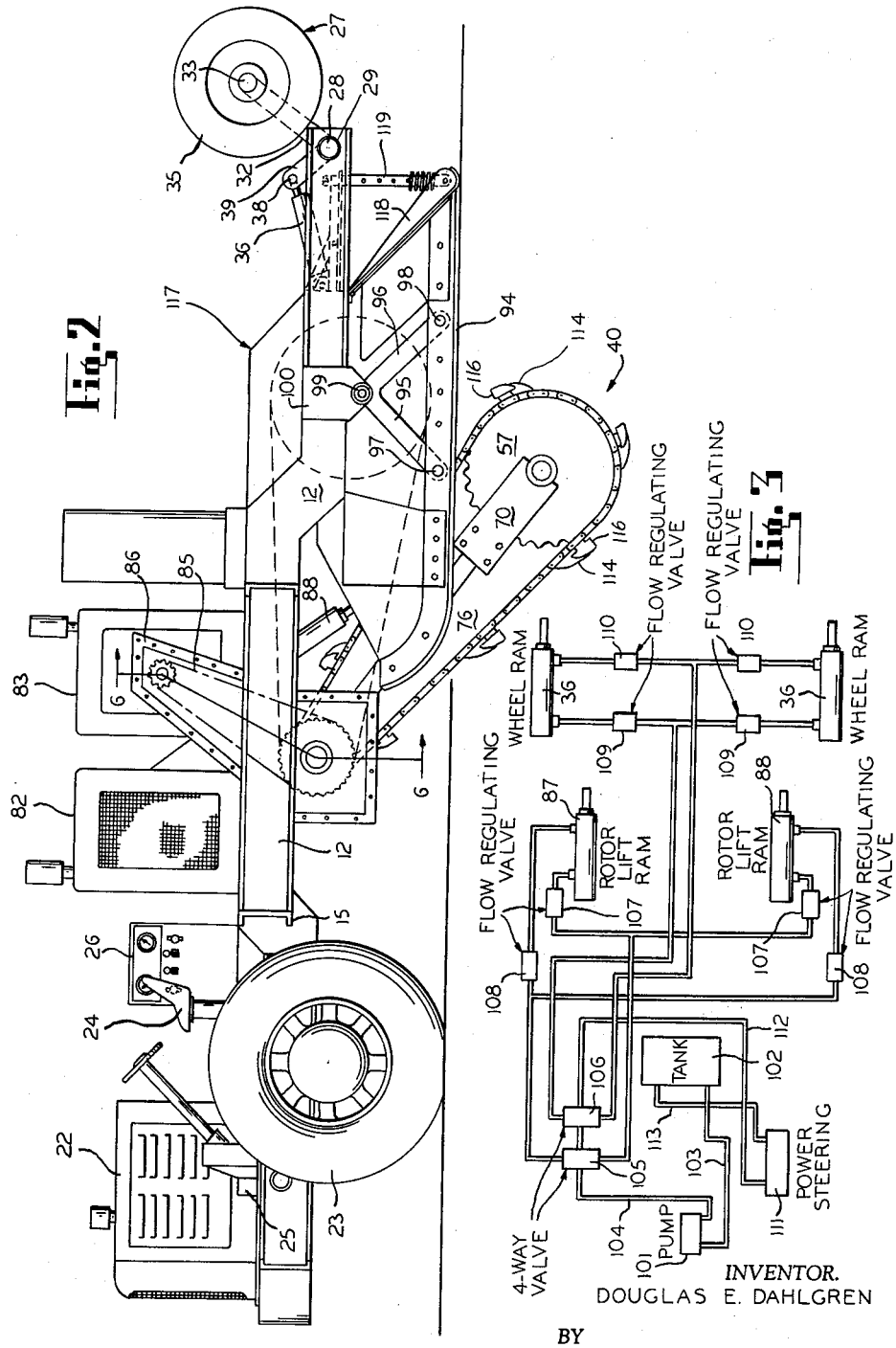

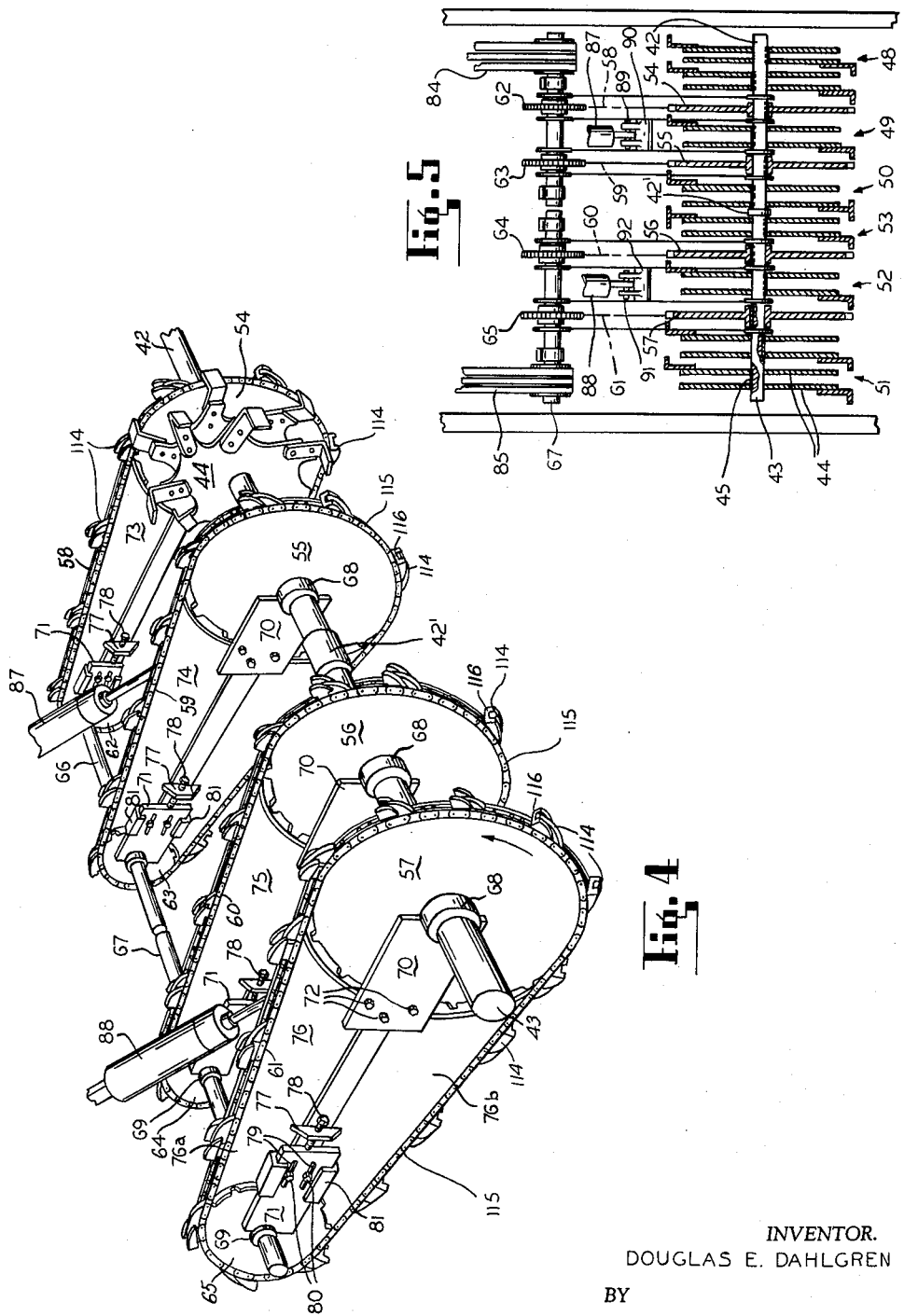

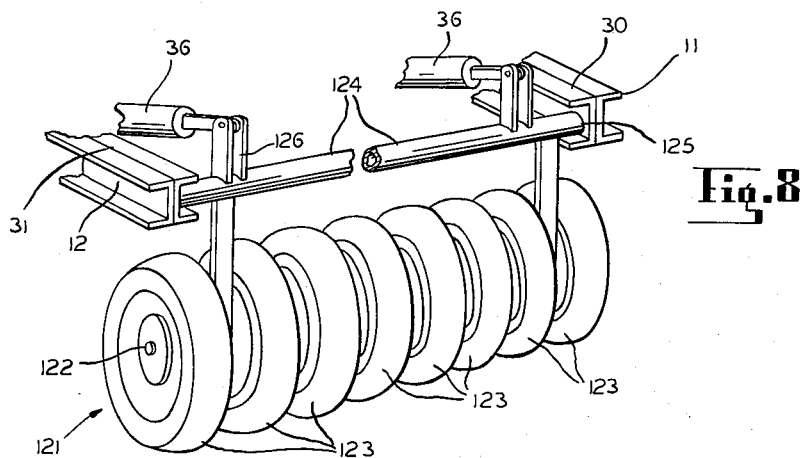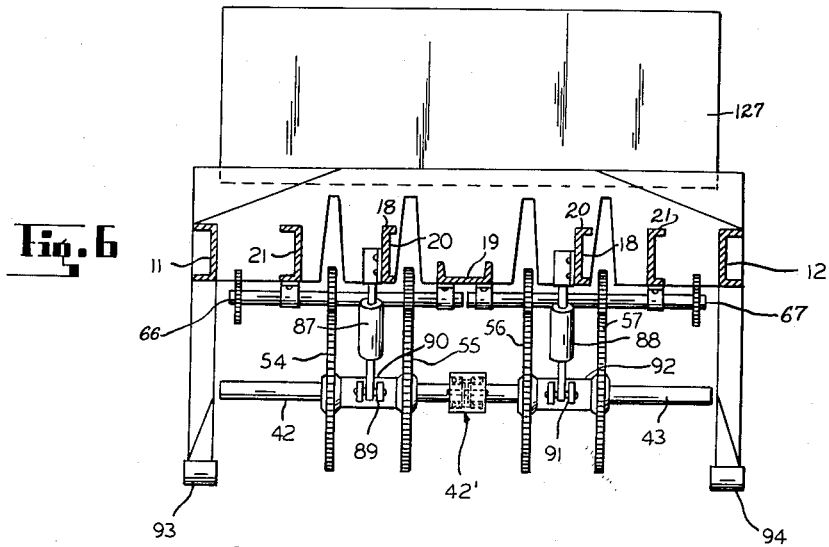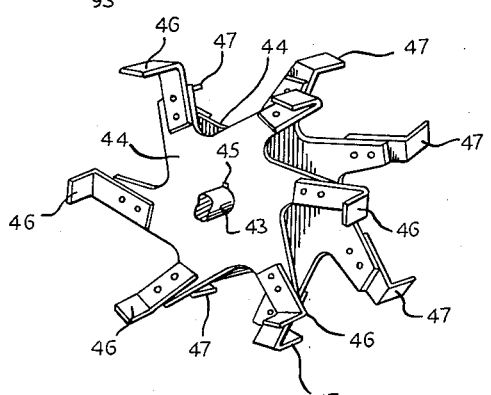

United States Patent Office 3,011,564
Patented Dec. 5, 1961

3,011,564
PULVERIZING AND MIXING MACHINE
Douglas E. Dahlgren, South Milwaukee, Wis., assignor, by mesne assignments, to American-Marietta Company, Chicago, Ill., a corporation of Illinois
Filed Aug. 21, 1957, Ser. No. 679,393
1 Claim. (Cl. 172—50)

The present invention relates to a pulverizing and mixing machine and more particularly to a mechanism for pulverizing, mixing and stabilizing earth surface areas for such purposes as building roads and tilling soil.

Earth pulverizing, mixing and stabilizing mechanisms have been known in the agricultural and road building arts for some time. In general, the known machines include tined rotors mounted as an attachment on a tractor or as an integral part of a tractor. The rotors are driven at selected depths to break-up the aggregates and earth surface materials and to mix and stabilize the same.

Driving connections for the rotors are usually made with the tractor engine either through chain drives connected to the ends of the rotors or gear couplings at the center of the rotor. In the former instance a substantial portion rotor width is lost and pulverizing depth is limited due to the chain drives. In the latter instance there is no pulverizing or stabilizing under the gearbox or transmission on the rotor shaft. The result is that mixing and stabilizing is not uniform across the entire width of the rotor.

The machines heretofore known also have been of limited width due to rotor weight and the difficulty of manipulating a machine with a wide rotor. The rotors are usually attached to the rear of the machine, behind the rear wheels of the tractor. A heavy rotor in this position tends to unbalance the machine. Wide rotors tend to hold a straight line course independently of the steering wheels at the front of the tractor.

These problems have become more serious since efforts have been made to build roads with wider lanes. With narrow rotors, several passes are necessary to build each lane of road. Accordingly, economical road building requires that rotary pulverizers and stabilizers be made with greater widths than heretofore thought possible.

Machines embodying the present invention may be made substantially wider without being troubled by the difficulties attending previous efforts to use wide pulverizing rotors. Many features of the present invention may be incorporated in heretofore known machines to make the same more efficient and permit the use of wider rotors with those machines.

Also, in machines embodying this invention the rotor assembly and rotor drive are cooperative to pulverize and stabilize an earth surface area substantially uniformly across the entire width of the rotor. For this purpose, the rotor is driven by chain drives in which the chains carry digger picks adapted to dig their own way through the earth surface and pulverize the same. Thus, the earth surface materials are pulverized and mixed across the entire width of the machine and the depth of operation is not limited by the drive chains.

Wide rotors present a difficulty in steering the machine. Another difficulty with wide rotors is that they may encounter different toughness or hardness of materials at different parts of the rotor. Both of these difficulties are overcome by this invention.

By the present invention rotors or rotor sections having short axial lengths are used in groups to form the full width rotor assembly. Each section of the rotor assembly is individually driven so that the speed of rotation of each rotor section may be individually controlled. By these means, the rotor may be employed as a part of the over-all steering arrangement for the machine. As an example, to make a left turn, the speed of the right-hand section of the rotor may be increased and/or the speed of the left-hand section of rotor may be decreased so that the rotor assembly will drive the mechanism to turn it to the left.

This arrangement of a split rotor with individual controls for each section of the rotor also serves to maintain the machine on a true course even when the materials being pulverized and stabilized vary across the width of the rotor. When running through such irregular material, the sections of the rotor encountering harder or tougher materials may be speeded up or provided with increased power whereby the course of a machine is held true.

Machines embodying features of the present invention are also operable to be conveniently transported without being unbalanced due to the great weight of the rotor. To accommodate the heavy rotor, the rotor and drive mechanisms are mounted on the frame of the machine between the ends thereof and transport wheels are provided at the ends of the frame. By so mounting the rotor and drive arrangements, there is no tendency for the rotor to tip the machine. When stabilizing an earth surface area, however, it is undesirable to have wheels at the rear of the machine leave tracks in the newly stabilized aggregate. To avoid this difficulty, means are provided to retract the rear wheels of the machine when the rotor is lowered to an operating position. Also, the rotor may be raised and the rear wheels lowered for transportation of the machine without stabilizing the earth's surface.

The machine is provided with a pair of skis laterally adjacent to the rotor but mounted on the frame of the machine. These skis may ride on the earth surface and if the earth surface is soft they may sink in slightly. These skis provide support for the rear end of the machine while the rotor is working in the earth.

In some instances it is desirable to compact the newly stabilized aggregate immediately following working thereof by the rotor. In accordance with this invention, a compaction roller assembly may be provided at the rear end of the machine. Also the compaction roller assembly may be retractably mounted and substituted for the rear wheels so that it may be used as transportation wheels when the rotor is not working the earth.

These and many other features of the present invention will become readily apparent to those skilled in the art and others from the following detailed description of an illustrative embodiment of the invention, from the claims, and from the accompanying drawings in which each and every detail shown is included as a part of this specification, in which like reference numerals refer to like parts, and in which:

FIGURE 1 is a plan view of a machine embodying this invention, and has certain parts broken away to better show other parts;

FIGURE 2 is an elevational view of the machine of FIGURE 1;

FIGURE 3 is a schematic illustration of the hydraulic system for the machine;

FIGURE 4 is a perspective view of the rotor drive arrangement and parts of the rotor assembly;

FIGURE 5 is a plan view of the rotor and drive assembly with the rotor shown in section;

FIGURE 6 is a sectional view taken along the line 6—6 of FIGURE 2, further showing the rotor and the drive arrangement therefor;

FIGURE 7 is a perspective view of a pair of rotor tine discs; and

FIGURE 8 is a perspective view of a pneumatic compaction roller assembly mounted at the rear of the machine.

There is shown in FIGURES 1 and 2 a complete, self-propelled vehicle for pulverizing, mixing and stabilizing earth surface areas and aggregate materials. The machine includes a frame having a pair of side channels or structural beams 11 and 12 which symmetrically converge from intermediate points 13 and 14 thereon, respectively, toward each other and toward the front of the machine. At their closest spacing these side frame members are secured together by a cross beam 15 extending transversely of the frame. Another cross beam 16 extends transversely of the machine and is secured to the side frame members 11 and 12 at points 13 and 14 thereon. A plurality of structural frame members 17, 18, 19, 20 and 21 are secured to the cross frame members 15 and 16 and extend longitudinally of the machine.

The frame members 18 and 20 are symmetrically disposed on opposite sides of the longitudinal center of the machine and extend toward the front of the machine beyond the cross beam 15 to provide a frame support for a traction engine 22, steerable front wheels 23, a driver's seat 24, steering, brake and clutch controls 25, and control panel 26. Additionally, such other items as hydraulic system controls, hydraulic system parts such as tanks and valves etc., steering controls and a power transmission are mounted at the front of the machine on the frame members 18 and 20.

At the rear of the machine there is provided a retractable rear wheel arrangement indicated generally at 27. This rear wheel arrangement includes a shaft 28 extending transversely of the machine and mounted with its ends journaled in bearings 29 on the side frame beams 11 and 12 and on reinforcing frame members 30 and 31 secured to the side frame beams 11 and 12, respectively. Parallel, radial spacer bars or arms 32 are secured to the shaft 28 and carry a rear wheel bearing shaft or axle 33. Rear wheels 34 and 35 are journaled on the axle 33.

When the wheels 34 and 35 are down, in a ground contacting position, they will support the rear end of the machine. When they are raised or retracted to a position as shown in FIGURES 1 and 2, they will allow the rear end of the machine to lower to a working reference level. Raising and lowering of the rear wheels is accomplished by any desired means operable to rotate the rear wheels about the axis of shaft 28. In this embodiment of the invention it is done by the use of hydraulic rams or piston and cylinder assemblies 36 having one end of each thereof pivotally connected to a cross frame member 37 secured to the side frame beams 11 and 12 and the reinforcing members 30 and 31. The other end of each of the rams is pivotally connected, as at 38, to crank levers 39, secured to the shaft 28.

Hydraulic actuation of the rams 36 will cause the shaft 28 to rotate in bearings 29 and thereby controllably retract or lower the rear wheels 34 and 35.

Between the cross frame members 15 and 37, and between the side frame beams 11 and 12, the machine carries a pulverizer, mixer and stabilizer rotor assembly indicated generally at 40, and a rotor drive mechanism indicated generally at 41.

The rotor assembly, best seen in FIGURES 4, 5 and 7 includes a pair of free floating shafts 42 and 43 each having a plurality of axially spaced tine plates 44 keyed or threaded thereto as at 45, for rotation therewith. Shafts 42 and 43 may be coupled together at their adjacent ends by a bearing assembly 42'. If it is desired to use the rotors individually or at different heights, the bearing assembly 42' may be removed.

The tine plates 44 are shown in detail in FIGURES 4 and 7; the illustration of FIGURE 7 is a segment of the rotor having shaft 43. All of the tine plates are substantially identical and are usually arranged in symmetrical pairs. One tine plate of each pair has tines 46 thereon extending to the left of the plate, while the other has tines 47 thereon extending to the right of the plate. The tines are secured to substantially radial arms formed as a part of the tine plates and may have any desired configuration suitable for pulverizing and stabilizing the earth surface and aggregate materials to be worked by the rotor.

In FIGURE 5 it is seen that the rotor assembly of this embodiment of the invention has two rotor shafts which are arranged coaxially and each of which has a number of tine plates keyed thereto. The tine plates are arranged on each shaft in groups indicated at 48, 49 and 50 on shaft 42, and 51, 52 and 53 on shaft 43. Between each group of tine plates on each rotor shaft, there is a sprocket wheel for driving connection with a chain drive to rotate the shaft. The rotor shaft 42 has two sprocket wheels 54 and 55 separated by tine plate group 49. Rotor shaft 43 has a pair of sprocket wheels 56 and 57 separated by the tine plate group 52.

The sprocket wheels on the rotor shafts mesh with chains 58, 59, 60 and 61, respectively, which in turn, mesh with sprockets 62, 63, 64 and 65, respectively, on a pair of power driven jack shafts 66 and 67. Through this arrangement, the rotors are driven by the jack shafts. The jack shafts 66 and 67 are coaxially journalled on the longitudinal frame members 17, 18, 19, 20 and 21 extending between the cross frame members 15 and 16.

The rotor shafts 42 and 43, in addition to being driven by the jack shafts 66 and 67, are supported by the jack shafts as illustrated in detail in FIGURE 4.

On each side of each sprocket wheel on each rotor shaft, and on each side of each sprocket wheel on each jack shaft, there is provided a bearing 68 on the rotor shafts and a corresponding bearing 69 on the jack shafts. These bearings are freely rotatable with respect to the shafts on which they are disposed. To each of the bearings 68 on the rotor shafts there is secured a tie plate 70 extending radially therefrom a distance slightly greater than the outside diameter of the sprocket wheels. Thus, there are two radial tie plates for each sprocket wheel, the tie plates being arranged in pairs on opposite sides of the sprocket wheels. There is a similar arrangement of tie plates 71 on each side of each sprocket on the jack shafts 66 and 67.

Each pair of tie plates 70 on the rotor shafts is provided with an arm that is secured to the tie plates, as by bolts 72. These arms extend from the tie plates 70 on the rotor shafts to the tie plates 71 on the jack shafts and are adjustably connected to the tie plates 71. Thus, there are four arms 73, 74, 75 and 76, an arm for each corresponding pair of sprocket wheels. Each arm is made in two longitudinal halves such as 76a and 76b of arm 76. Tie plates 70 and bolts 72 hold the arm halves together. That is, the arm 73 extends from the sprocket 54 to the sprocket 62. Arm 74 extends from the sprocket 55 to the sprocket 63. These two arms serve to mechanically secure the jack shaft 66 and the rotor shaft 42 together. Arms 75 and 76 similarly serve to secure the jack shaft 67 to the rotor shaft 43.

Adjustment of the arms is provided to take up slack in the drive chains that interconnect the sprockets on the rotor shafts with the sprocket on the jack shafts and to permit removal and replacement of those drive chains. Each arm is slotted at the end thereof that is adjacent to a sprocket wheel on one of the jack shafts. Within the slot there is secured a backing nut 77 through which an adjustment bolt 78 is threaded for engagement with the rearward edge of a tie plate 71, note FIGURE 4. Each tie plate 71 is slotted, as at 79 to receive a pair of bolts 80 received in corresponding slots in the arms and which may be tightened to clamp the tie plates to the arms in their adjusted position. The tie plates are slidably arranged in channels 81 fixed to the sides of the arms to retain the tie plates in properly aligned positions during adjustment thereof with respect to the arms.

The arms 73, 74, 75 and 76 provide rigid structural supports for the rotor sections and are tapered or otherwise shaped to closely follow the path of the inner surface of the chains 58, 59, 60 and 61, respectively.

The arms serve as back-up members to support the portions of the chains that are out of engagement with the sprockets or spanning the gap therebetween. For maximum support of the chains, the ends of the arms are annularly recessed substantially coaxially with the sprockets.

By this arrangement, whenever the jack shafts 66 and 67 are power driven or rotated, the rotors will be correspondingly driven by the chain drive interconnection between the sprockets keyed to the rotors and the sprockets keyed to the jack shafts.

An important feature of this invention lies in the feature of the machine whereby the rotor will substantially uniformly pulverize and stabilize aggregates and earth surface materials across the full width of the rotor. As the tine plates and tines rotate they dig into and break up the aggregate and earth surface materials into which they are driven. The regions not engaged by the tine plates and tines in heretofore known machines of this type, were not broken up or pulverized or stabilized by the machine. This left the roadbed or tilled earth irregular in composition and compactness below the surface.

With the mechanism of this invention the material in the spaces between the tine plate groups 48, 49, 50 and 51, 52, 53 is dug out, broken up, pulverized and stabilized. To accomplish this, the driven chains 58, 59, 60 and 61 that interconect sprocket on the jack shafts with the sprockets on the rotor shafts, have fixed thereto digger picks 114. See FIGURES 2 and 4. The digger picks 114 on each chain are connected to alternate pairs of side links 115 coupling the rollers in the chains together. The picks themselves are provided with blunt front faces 116 adapted to dig into earth materials and aggregates and break-up the same.

These pick-equipped chains thus dig a path for the rotor support arms and aid in uniformly pulverizing and stabilizing the earth surface materials and aggregates worked by the machine. The lower surfaces or edges of the arsm 73, 74, 75 and 76 serve as a back-up member for the region of the chain and the picks digging into the earth surface and aggregates, and the upper edges support the returning portions of the claims.

The machine is provided with a pair of rotor drive engines 82 and 83 mounted on the frame members 18 and 20, to drive the jack shafts 66 and 67, respectively. The engines are supplied with fuel from a tank 127 which also supplies fuel to the traction engine 22. The engine 82 drives a fluid coupling 82' which is coupled through a chain drive 84 to the outer end of jack shaft 66. The engine 83 drives a fluid coupling 83' which is coupled through a chain drive 85 to the outer end of jack shaft 67. The chain drives 84 and 85 may be conventional arrangements of that type for coupling a drive shaft to a driven shaft. These chain drives are enclosed in housings 86.

The engines 82 and 83 serve to individually drive the rotors or rotor sections. By individual control of these two rotor engines, the speed and power of the rotor sections may be individually controlled for such purposes as maintaining a true course over irregular terrain, or assisting in steering the vehicle about curves during working of the rotor in the earth surface.

When the machine is moving from job to job, it is desirable that the rotor be raised to the dotted line position shown in FIGURE 2. The rotor sections are raised and lowered by hydraulic rams or pistons and cylinder assemblies 87 and 88, respectively, see FIGURES 4, 5 and 6. The upper end of each of these rams is pivotally connected to the frames of the vehicle. The lower end of the ram 87 is pivotally connected, as at 89, to a cross bar 90 secured to arms 73 and 74. The lower end of the ram 88 is pivotally connected, as at 91, to a cross bar 92 secured to arms 75 and 76.

The vehicle is provided with a pair of skis 93 and 94, one on each side of the machine, pivotally secured to the vehicle frame. A pair of arms 95 and 96 are secured to ski 94 at points 97 and 98, respectively. The other ends of the arms 95 and 96 are pivotally secured, as at 99, to a support bracket 100 secured to the frame 12. Ski 93 is similarly supported on frame 11. By this arrangement the skis tend to ride over irregular terrain and provide support for the vehicle.

The hydraulic system for steering the vehicle, retracting and lowering the rear wheels and raising and lowering the rotor is shown in FIGURE 3. The system includes a pump 101 driven by the traction engine 22 and supplied with fluid from a tank 102 through fluid line 103. The outlet of the pump is supplied through line 104 to a pair of serially connected four-way valves 105 and 106. The first of these valves, 105, supplies pressurized fluid through flow regulators 107 to the upper end of each of the rotor lift rams 87 and 88. Another outlet of valve 105 supplies pressurized fluid through flow regulators 108 to the lower end of each of the rotor lift rams 87 and 88. Control of the four-way valve 105 permits the rotor lift rams 77 and 78 to be controllably actuated to raise and lower the rotor assembly 40.

The second four-way valve 106 controls retracting and lowering of the rear wheels by controlling actuation of the rear wheel rams 36. One outlet of the valve 106 supplies pressurized fluid to the upper end of each of the wheel rams 36 through flow regulators 109. Another outlet of four-way valve 106 supplies pressurized fluid to the lower end of each of the wheel rams 36 through flow regulator 110.

The steering of the front wheels of the vehicle is controlled by a power steering control mechanism 111 supplied with pressurized fluid from pump 101 by being serially connected through line 112 with four-way valve 106. The outlet from the power steering control 111 is connected through line 113 as a return to the tank 102.

The controls for the four-way valves are mounted on the control panel 26 adjacent to the driver's seat 24 so that the driver may control all of the operations of the vehicle with maximum convenience.

In operation, the driver will start with the rear wheels lowered and drive the vehicle, by actuation of the traction engine 22, to the place where pulverizing and stabilizing of an earth surface area is to be effected for any desired purpose, such as roadbed building. At that point the driver will retract or raise the rear wheels 34 and 35 by actuating the rear wheel rams 36 through control valve 106. He will then start rotor engines 82 and 83 to drive the jack shafts 66 and 67. The jack shafts in turn will drive the rotors. Then the rotors are lowered by control of four-way valve 105, to the desired depth below the lower surface skis 93 and 94.

The machine will then drive forwardly through the combined forces of the rotating rotor and the traction or steering wheels 23.

To turn a curve, the driver will increase the speed and power of the engine driving the rotor on the opposite side of the machine from the direction toward which the turn is to be made whereby that rotor will drive forwardly at a greater rate than the other rotor. This action combined with appropriate steering of the traction wheels 23 will permit the vehicle to turn in a smooth arc for continuous roadbed building.

While the rotor is operating, the earth surface materials and aggregates are pulverized and thrown about with considerable force. To retain the materials under the machine and to provide for smooth spreading of the material behind the machine, the machine is equipped with a hood 117, see FIGURES 1 and 2. The hood extends substantially horizontally over the rotor and then slants downwardly towards the earth surface to an adjustable hood gate 118 hingedly secured to the frame of the machine. Hood gate adjustment units 119 are provided on the machine for adjusting the vertical position of the lower edge of the hood gate whereby the height of the loosely compacted stabilized material is controlled. To facilitate entrance to the rotor, as for maintenance purposes, the leading or horizontal section of the hood is split and hinged as at 120.

If it is desired to utilize the machine for combined stabilizing and compacting operations in a single pass of the machine, the rear wheel assembly 27 may be replaced by a compaction roller assembly as shown in FIGURE 8. The pneumatic compaction roller assembly 121 has a wheel axle 122 carrying a plurality of axially aligned, closely spaced pneumatic compaction wheels 123. The wheel axle 122 is secured to a positioning shaft 124 journaled in bearings 125 at the rear end of the frame, on side frame beams 11 and 12 and reinforcing frame members 30 and 31. This positioning shaft may be the same as shaft 28 or may be a replacement therefor.

The compaction roller assembly 121 may be raised or lowered, as desired, by actuation of wheel rams 36 pivotally connected to the cranks 126 on positioning shaft 124, corresponding to cranks 39 on shaft 28 for the retractable rear wheel assembly 27.

In a lowered position, the pneumatic rollers or roller wheels 123 will operate either as transportation rear wheels for the vehicle or as compaction rollers for newly stabilized material worked by the rotor assembly. If compaction is not desired, the assembly 121 may be retracted or raised by actuation of the rams 36.

From the foregoing it will be observed that numerous modifications and variations may be effected without departing from the true spirit and scope of the novel concepts and principles of this invention.

I claim:

An earth and aggregate materials pulverizing and mixing machine comprising a mounting frame, a retractable wheel assembly secured to said frame at the rear end thereof, steerable wheels mounted on said frame at the front end thereof, a pair of skis secured to opposite sides of said frame, a plurality of rotor drive engines mounted on said frame, a plurality of jack shafts journaled on said frame and coupled to said engines, respectively, a plurality of pulverizer rotors, each rotor having a shaft and a plurality of pulverizer tine plate members secured to the shaft for rotation therewith, a support arm journaled on each jack shaft and on each rotor shaft whereby said rotors are secured to said jack shafts, a ram secured to said arms and to said frames to controllably raise and lower said rotors with respect to said frame, a sprocket on each of said jack shafts, a sprocket on each of said rotor shafts, chains coupling said sprockets on said jack shafts to said sprockets on said rotor shafts, and digger picks secured to each of said chains.

References Cited in the file of this patent

UNITED STATES PATENTS

| | | |
|---|---|---|
| 820,152 | Sweeny | May 8, 1906 |
| 1,122,481 | Cowart | Dec. 29, 1914 |
| 1,369,745 | Jackson | Feb. 22, 1921 |
| 1,390,089 | Cook | Sept. 6, 1921 |
| 1,496,895 | Kurtz | June 10, 1924 |
| 1,549,700 | Wilson | Aug. 11, 1925 |
| 1,588,564 | Wilson | June 15, 1926 |
| 1,676,646 | Funk | July 10, 1928 |
| 1,930,507 | Casperson | Oct. 17, 1933 |
| 2,169,406 | Cost et al. | Aug. 15, 1939 |
| 2,270,390 | Summers | Jan. 20, 1942 |
| 2,394,017 | Seaman | Feb. 5, 1946 |
| 2,598,219 | Burgess | May 27, 1952 |
| 2,683,608 | Matheson | July 13, 1954 |
| 2,793,576 | Carpi | May 28, 1957 |